Aug. 26, 1969   C. L. REID   3,463,471
SLAG HAULER LINER
Filed Dec. 28, 1966   2 Sheets-Sheet 1
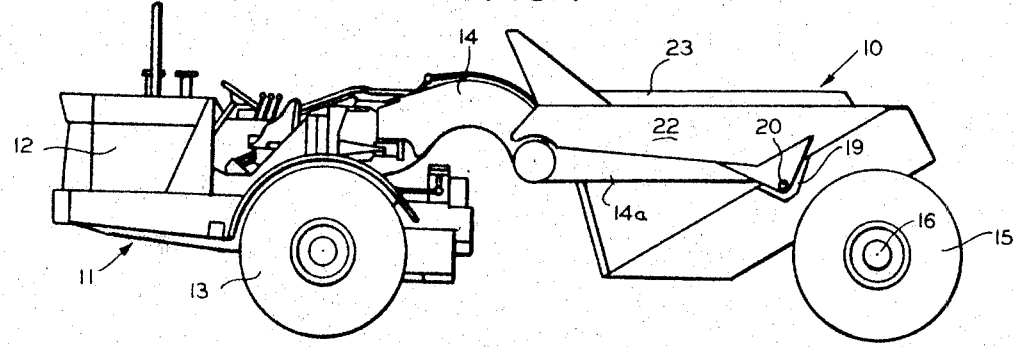
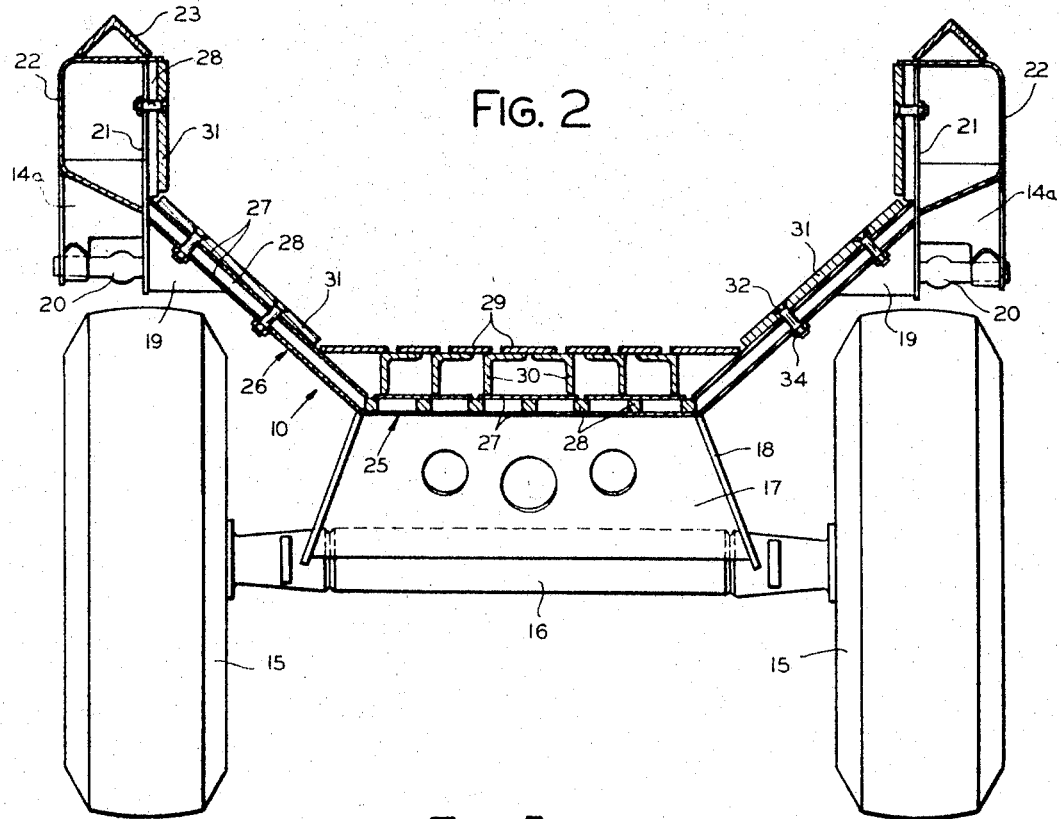
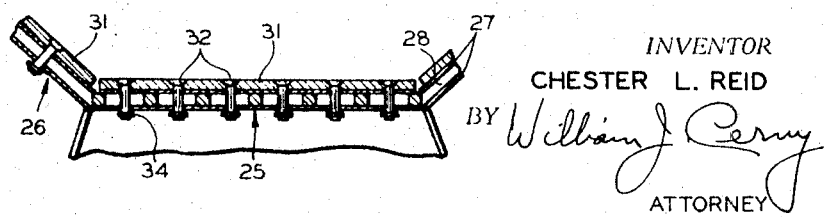
INVENTOR
CHESTER L. REID
BY William J. Cerny
ATTORNEY Aug. 26, 1969  C. L. REID  3,463,471
SLAG HAULER LINER
Filed Dec. 28, 1966  2 Sheets-Sheet 2
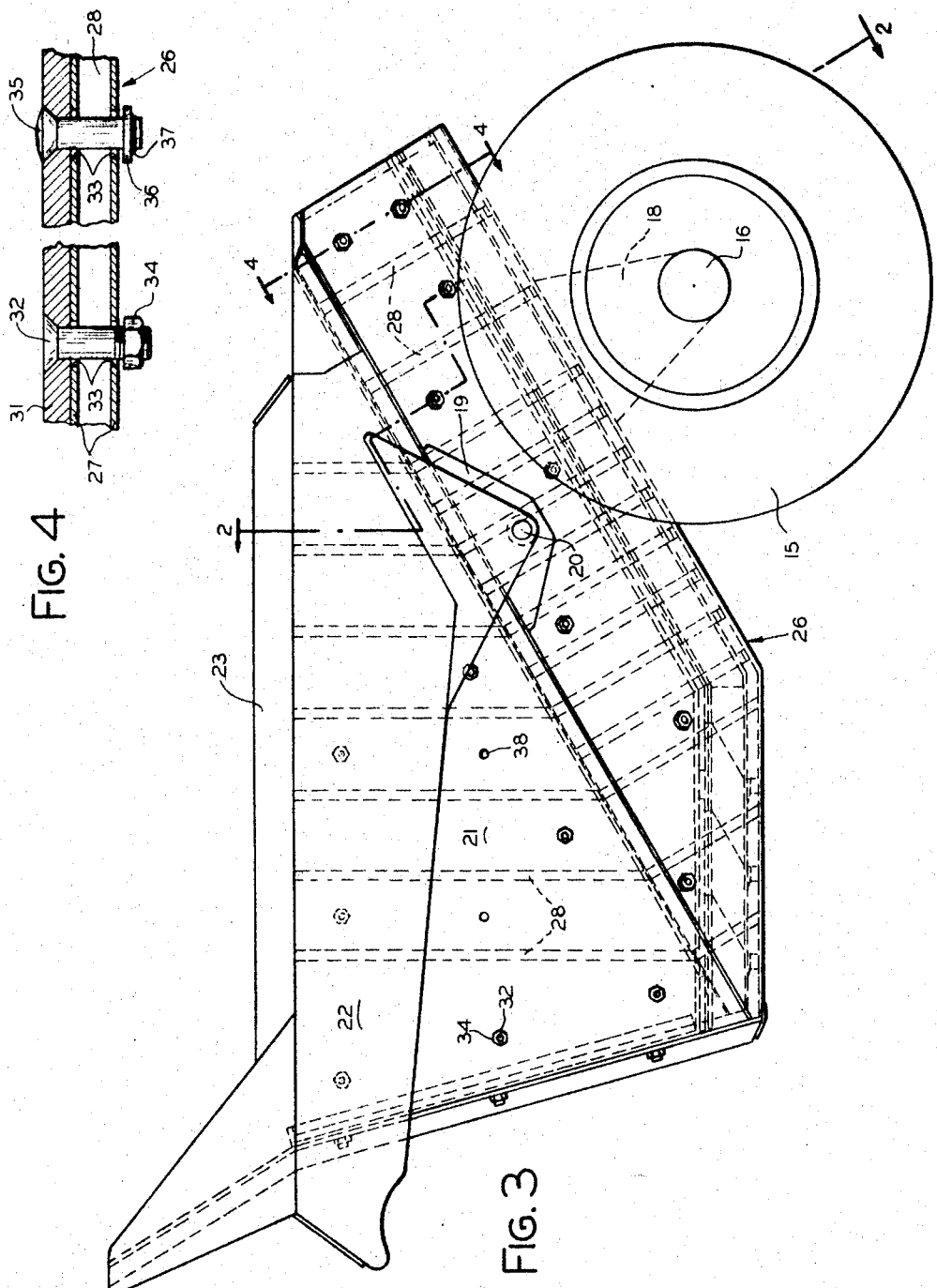
INVENTOR
CHESTER L. REID
BY William J. Perry
ATTORNEY

United States Patent Office 3,463,471
Patented Aug. 26, 1969

3,463,471
SLAG HAULER LINER
Chester L. Reid, Benton Harbor, Mich., assignor to Clark Equipment Company, a corporation of Delaware
Filed Dec. 28, 1966, Ser. No. 605,401
Int. Cl. C21b 3/10; F23j 1/02
U.S. Cl. 263—45                    9 Claims

ABSTRACT OF THE DISCLOSURE

An expansion-compensating construction for slag receptacles employs headed fasteners to secure heavy liner plates in overlying relation to preferably hollow receptacle walls, with oversized apertures loosely receiving the fasteners, which have circumferential projections on their end portions so spaced as to permit slight longitudinal movement of the fasteners.

---

The present invention relates to a slag hauler or similar receptacle for hot slag by which it may be transported out of a steel mill for dumping.

Due mainly to expansion caused by the heat of the slag, such receptacles have had a relatively short life before being effectively destroyed by cracking and splitting. Many attempts have been made to solve this problem, such as providing a fluted or corrugated construction for such receptacles, as for example in Howatt U.S. Patent 2,047,743, issued July 14, 1936, and Mohr U.S. Patent 2,938,717, issued May 31, 1960. Another attempt is that disclosed in Neilsen U.S. Patent 2,294,044, of Aug. 25, 1942, for "Ladle" in which a slag ladle of inverted frusto-pyramidal shape is formed by suitably reinforced plates having exterior portions in overlying relation secured together by means of bolts which pass through registering bolt apertures in the overlying portions of larger diameter than the bolts, to provide a clearance allowing relative sliding movement of the plates in expansion or contraction. Such expedients have not been entirely satisfactory.

The present inventive concept provides hollow walls for a vehicle or other slag receptacle which are open to the ambient atmosphere, and are overlaid by liner plates loosely secured on the inner surfaces of the walls. Bolts or similar fasteners extend through the liner plates, and project through oversized apertures in the walls, allowing relative shifting or sliding movement between the plates and walls. On the outwardly extending end portions of the fasteners are secured nuts or other circumferentially or radially projecting parts or elements, spaced from the heads of the bolts or similar fasteners by a distance sufficient to allow a slight longitudinal movement or play of the fasteners in their longitudinal direction, or transversely of the plates and walls. The construction of applicant permits relative movement, or allows for expansion, of the liner plates and walls not only in their respective planes, but transversely, or in the direction of their thickness, or in other words, in all directions. This avoids or reduces the stresses which otherwise occur by reason of the expansion of such parts when tightly clamped together by bolts, rivets, or the like. In addition, the hollow wall structure provides a cooling effect by reason of the circulation of air permitted therethrough, thus dissipating heat and reducing the degree of expansion. The structure of this application provides far longer life of slag receptacles than achieved by previous constructions.

Among the objects of the invention are the provision of a novel and improved wall construction for slag receptacles which minimize stresses in all directions resulting from thermal expansion and contraction to afford long life for such receptacles, to provide for a slag receptacle a hollow wall construction open to ambient atmosphere for improved heat dissipation to reduce heat transfer to exterior receptacle parts for minimizing stresses on welds and other connections, and to provide means for loosely securing liner plates to the inner faces of slag receptacle walls allowing unrestrained expansion of the plates and walls in all directions.

Other and further objects, advantages, and features of the invention will be apparent to those skilled in the art from the following detailed description, taken in conjunction with the accompanying drawings, in which:

FIG. 1 is a side elevational view of a slag hauler according to the invention, comprising a wheeled receptacle coupled to a tractor;

FIG. 2 is a cross-sectional view on an enlarged scale, taken substantially as indicated by the line 2—2 in FIG. 1;

FIG. 3 is a side elevational view, on an enlarged scale, of the receptacle shown in FIG. 1;

FIG. 4 is an enlarged fragmentary sectional view taken substantially as indicated by the line 4—4 in FIG. 3, showing in detail the manner of securement of the liner plates to the receptacle walls; and FIG. 5 is a fragmentary cross-sectional view of the receptacle, similar to FIG. 2 showing a modified construction.

Referring to the drawings, there is shown in FIG. 1 a slag hauler including a wheeled receptacle 10, in this case of the rear dumping type, drawn by a wheeled tractor generally designated as 11. The slag hauler shown is of the general type of vehicle illustrated in R. W. Kling Patent 2,752,193, issued June 26, 1956, for "Rear Dump Trailer," although the invention herein is not limited to a dumping trailer or other dumping vehicle, nor even to a wheeled receptacle. Accordingly, the tractor 11 need not be described, except that it may be noted it is provided with a suitable engine or motor 12 for driving the wheels 13, and has a gooseneck 14 or other means for connection to the receptacle 10, the gooseneck having a bifurcated rearward extension provided by a pair of laterally spaced fork arms 14a.

The receptacle body is supported on wheels 15 carried by an axle 16 to which the receptacle body is connected by a mounting assembly comprising transverse plates 17 and gusset plates 18 welded to the axle and the bottom of the body. At each side of the body is a bracket 19 carrying a trunnion 20 journaled in one of the rearwardly extending fork arms 14a of the tractor gooseneck, so that the receptacle is pivoted in the bifurcated extension of the gooseneck so that it may be tilted for dumping. The tilting of the receptacle about the axis provided by the trunnions 20 may be effected as by hydraulic rams (not shown) connected between the gooseneck structure and the receptacle. An upper portion of each side of the receptacle is provided by a vertical wall plate 21 from which the adjacent trunnion 20 may project outwardly. A shroud 22 suitably welded to the plate 21 may extend outwardly and downwardly from the upper portion of each plate over the ram and trunnion bracket 19. A longitudinally extending angle member 23 may be welded to the horizontal upper surface of each shroud 22 in reinforcing relation.

The body of the receptacle 10 comprises a bottom wall 25 to which the axle mount is welded, and side walls extending upwardly from the side edges of the bottom wall. The side walls comprise upper vertical portions provided by the plates 21, and lower side portions 26 extending at an angle upwardly and outwardly from the side edges of the bottom, and welded or otherwise suitably secured to the bottom 25 and the plates 21. The bottom wall 25 and lower side wall portions 26 are of hollow construction, provided by inner and outer plates 27 spaced apart by and welded to spacer bars or ribs 28. As best shown in FIGS. 2 and 3, the spacer bars 28 extend longitudinally in the bottom wall 25, and laterally or transversely in the lower side wall portions 26. For convenience in fabrication, either of the plates 27 of the hollow wall structure may be formed in sections, as evidenced from the inner plate of the bottom wall 25 as shown in FIG. 2. The upper side wall portions in this instance have vertically extending spacer bars 28 welded to the inner faces of the vertical plates 21, but differ from the bottom wall and lower side portions in not having an inner plate paralleling the outer plate 21.

Over the bottom wall 25 there is secured a protective lining provided by a plurality of longitudinally extending horizontal plate elements 29 the laterally outer of which are welded to the inner plates 27 of the lower side wall portions 26. The plate elements are also welded along their longitudinal edges to horizontally disposed legs of angle members 30 extending longitudinally of the receptacle underlying the gaps between adjacent plate elements 29. The other, and vertically disposed, leg of each angle member is welded to the inner plate 27 of the bottom wall 25. The members 30 both secure the lining plate elements 29 and space them from the bottom wall 25. It will be evident that in effect a false bottom is provided by the lining structure, defining with the hollow bottom a hollow structure divided into a number of longitudinal air passages by the members 30. A very strong bottom structure, obviously, is also provided by this arrangement. Both the hollow bottom wall 25 and the overlying hollow lining structure are open to atmosphere at least at the rear end of the receptacle body, and if desired apertures may be provided through the plates 27 of the bottom wall 25 to provide additional communication with ambient atmosphere. The plate elements 29 and angle members 30 are of suitable thickness for the strength desired.

Liner plates 31 are disclosed overlying the inner faces of the lower side wall portions 26 and the inner faces of the spacer bars 28 of the upper side wall portions. The liner plates 31 are preferably of considerable thickness, greater, for example, than the lining plate elements 29. The liner plates 31 are not fixed on the side wall portions, but are attached in such a manner that relative shifting and sliding movement between plates 31 and the side wall portions overlaid thereby may take place as the parts expand and contract, and also allowing for expansion of the plates 31 and side wall portions transversely, or in the direction of their thicknesses. The manner of securing the liner plates 31 so as to allow for expansion in all directions is best illustrated in and understood from FIG. 4. As shown in this figure, the plates 31 are mounted on the side wall portions 26 by means of bolts, rivets, or similar pin-like fasteners, preferably headed at one end, extending through each plate 31 and the wall portion overlaid thereby and projecting outwardly of the latter. Two different pin-type fasteners which may be employed are shown in FIG. 4.

To the left in the figure, the fastener is illustrated as a bolt 32 which extends through a suitable aperture provided therefor in the plate 31 and through aligned apertures 33 in the inner and outer plates 27 of the side wall portion, of greater diameter than the aperture in the plate 31 and than the bolt 32. On the threaded outer end of the bolt a nut 34 is disposed, spaced from the head of the bolt a distance such that when the bolt head is engaged with the plate 31 the nut is spaced slightly from the outer plate 27. The spacing of the nut from the wall 26 is exaggerated in the drawing, for clarity in illustration. The circumferential or radial projection of the nut 34 is, of course, greater than the radial extent of the aperture 33 in the outer plate 27. The nut is secured in the desired location longitudinally of the bolt, or in the desired spaced relation to the bolt head, in any suitable manner, as by peening the threads, or by tack welding or the like. It will be evident that the nut and the head of the bolt provide circumferential or radial projections preventing passage of the bolt through the aligned apertures in the plate 31 and side wall portion plates 27. Instead of a head, of course, some oher radial projection may be employed on the fastener.

To the right in FIG. 4, the fastener is shown as taking the form of a rivet 35 extending through the plate 31 and the oversized apertures 33 in the inner and outer plates 27 of the side wall portion 26, and having a washer 36, of greater diameter than the apertures 33, secured in the same spaced relation to the head of the rivet as is the nut 34 on the bolt 32. The rivet may be secured in place at the desired point longitudinally of the rivet by welding, as at 37. Preferably, the heads of the bolts 32 or rivets 35 are disposed inwardly of the receptacle walls and are countersunk in the liner plates 31, as shown.

The securement of the liner plates 31 on the upper side wall portions is the same as illustrated and described in connection with the side wall portions 26, except that the inner wall plate 27 is of course absent and the oversized apertures for the fasteners are provided only in the outer plate 21.

In FIG. 5 there is shown a modification of the receptacle body construction, specifically of the bottom structure. In this modified construction, the bottom wall 25 is formed in the same manner as shown in FIG. 2, but with a liner plate 31 substituted for the construction employing the angle members 30 and bottom plates 29. The liner plate 31 is loosely secured on the bottom wall in the same manner that the other liner plates 31 are secured on the side wall portions, by means of bolts 32 passing through oversized apertures in the plate 27 of the bottom wall, and with nuts or other radial projections on the outer ends thereof spaced from the bolt heads as already described. Of course, other fasteners may be employed in a similar manner, as explained hereinabove such as the rivets 35.

The manner of attaching the liner plates 31 disclosed herein results in long life for the receptacle, avoiding the cracking of parts and the rupturing of welded connections resulting from expansion and contraction in handling the hot slag. This is apparently due in part to the hollow wall construction of the receptacle, the interiors of the walls being open to ambient atmosphere at at least one edge thereof, as in the case of the bottom wall 25, or through the apertures 33, or both. Additional apertures 38 (FIG. 3) may be provided if desired. This allows a circulation of air within the walls to assist in dissipating heat, thus minimizing expansion of the parts and reducing the stresses imposed thereby upon the receptacle body. The upper side wall portions are substantially the same as the lower side wall portions or bottom wall so far as heat dissipation by reason of hollow construction is concerned, since the wall plates 21 and liner plates 31 provide a hollow wall structure. The primary difference is that the loosely mounted liner plates 31 engage directly on the spacer bars 28, in place of the omitted inner wall plates 27. The advantageous result is also due partly to the manner of securement of the liner plates 31 on the walls, the oversized holes 33 allowing relative movement in their planes of the plates and walls as a result of expansion and contraction, while the provision of pin-type elements with radial or circumferential projections spaced apart longitudinally a distance greater than the combined thickness of the respective wall and its overlying liner plate permits relative movement of the plate and wall longitudinally of the fasteners, or in other words, in the direction of the thickness of the wall and plate. This allows for expansion of the liner plate and wall in this transverse or thickness direction when heated by contact with the molten slag. Thus the plate and wall may move or expand relative to each other in any direction. It will be evident that restraint against expansion in the direction of thickness would also tend to interfere with expansion in the planes of the liner plates and walls. Thus, stresses in the plates and wall be reason of their being tightly secured together at spaced points are avoided. Elimination of the stresses greatly reduces the possibility of cracking thereof, or of breaking of welds connecting parts together. Of course, the invention may be utilized in connection with hot materials other than slag.

The embodiments of this inventive concept illustrated herein are exemplary and not exhaustive, the invention not being limited thereto since modifications and variations thereof may be made through a wide range without departing from the spirit and scope of the invention as set forth in the appended claims.

I claim:

1. In a receptacle for hot slag or the like having a bottom wall and side walls extending upwardly from said bottom wall, the improvement comprising movably secured lining plates overlying at least certain of said walls for lining the interior surfaces of said certain walls, fastening elements extending through aligned apertures in the respective lining plates and overlaid walls in approximately perpendicular relation to said plates and said walls, said apertures in each overlaid wall being oversized to receive said elements loosely therethrough, and a pair of longitudinally spaced radially extending projections on each element to prevent passage thereof through the aligned apertures, said projections being spaced apart sufficiently to allow of slight relative movement longitudinally of the element.

2. The improvement as defined in claim 1, in which all of said walls have said overlying lining plates thereon.

3. The improvement defined in claim 1, in which at least certain of said walls are hollow to define an air space therein.

4. The improvement defined in claim 3, in which the receptacle includes parts exterior to said walls, at least certain of said parts being connected to a hollow wall for minimization of heat conduction to said connected parts.

5. The improvement defined in claim 3, in which a hollow wall has openings providing communication with air outside the receptacle.

6. The improvement defined in claim 5, in which said openings comprise said oversized apertures.

7. The improvement defined in claim 1, including fixed liner plates in spaced overlying relation to said bottom wall and defining an air space therewith, and spacer means extending between the bottom wall and said fixed liner plates.

8. The improvement defined in claim 7, in which the bottom wall is hollow to provide an air space therein.

9. The improvement defined in claim 8, in which said air spaces are open to communication with ambient atmosphere.

References Cited

UNITED STATES PATENTS

| | | | |
|---|---|---|---|
| 1,861,946 | 6/1932 | Wilhelmi | 266—39 |
| 2,149,891 | 3/1939 | Kitto | 266—39 |
| 2,772,960 | 12/1956 | Todd et al. | 266—39 X |
| 2,881,488 | 4/1959 | Schweinberg | 266—39 X |
| 3,258,255 | 6/1966 | Tippmann | 266—43 X |
| 3,358,986 | 12/1967 | Anderson et al. | 266—43 |

J. SPENCER OVERHOLSER, Primary Examiner

R. SPENCER ANNEAR, Assistant Examiner

U.S. Cl. X.R.

266—39